United States Patent
Kanaya

[19]
[11] Patent Number: 6,137,597
[45] Date of Patent: Oct. 24, 2000

[54] METHOD OF CONTROLLING NETWORK FACSIMILE APPARATUS

[75] Inventor: Atsushi Kanaya, Isehara, Japan

[73] Assignee: Ricoh Company, Ltd., Tokyo, Japan

[21] Appl. No.: 08/985,847

[22] Filed: Dec. 5, 1997

[30] Foreign Application Priority Data

Dec. 6, 1996 [JP] Japan ................................. 8-340399

[51] Int. Cl.$^7$ ....................................................... H04N 1/00
[52] U.S. Cl. ........................................... 358/402; 358/403
[58] Field of Search ..................................... 358/402, 438, 358/440, 403, 434, 435, 436, 437, 405, 407

[56] References Cited

U.S. PATENT DOCUMENTS

| | | | |
|---|---|---|---|
| 5,189,525 | 2/1993 | Kotani ..................................... | 358/407 |
| 5,206,743 | 4/1993 | Hochman et al. ...................... | 358/440 |
| 5,283,665 | 2/1994 | Ogata ..................................... | 358/405 |
| 5,521,719 | 5/1996 | Yamada .................................. | 358/438 |
| 5,559,611 | 9/1996 | Bloomfield et al. ................... | 358/407 |
| 5,740,230 | 4/1998 | Vaudreuil ................................ | 379/88 |
| 5,805,298 | 9/1998 | Ho et al. ................................. | 358/402 |
| 5,872,641 | 2/1999 | Ozeki et al. ............................ | 358/434 |
| 5,991,290 | 11/1999 | Malik ..................................... | 358/440 |

OTHER PUBLICATIONS

Japanese Patent Abstract Publication No.: 07066957A; Inventor: Takahashi Jun; Publication Date: Mar. 10, 1995.
Japanese Patent Abstract Publication No.: 6–164645 (A); Inventor: Toshiaki Yamada; Publication Date: Jun. 10, 1994.

*Primary Examiner*—Kimberly A. Williams
*Attorney, Agent, or Firm*—Cooper & Dunham LLP

[57] ABSTRACT

A method of controlling a network facsimile apparatus for exchanging data over a local area network and a publicly switched network uses an address conversion table for storing sub-addresses, corresponding mail addresses, and corresponding passwords in a way that relate each of the sub-addresses to a corresponding password and mail address for transmitting image information received over the publicly switched network via the local area network to a terminal at a mail address corresponding to a sub-address received from a transmitting terminal. If the apparatus receives a sub-address and corresponding password information when the image information is received, the apparatus sends an electronic mail message notifying of receipt of the image information and requesting password information from the terminal at the mail address in the address conversion table corresponding to the received sub-address. The apparatus transfers the received image information to the terminal at the mail address by way of an electronic mail message only when password information from the terminal at the mail address accords with the password information registered in the address conversion table corresponding to the mail address.

24 Claims, 11 Drawing Sheets

| Log-in name | SUB | PWD |
|---|---|---|
| user1 | 123 | ***** |
| user2 | 124 | ?****? |
| | | |

FIG. 5

```
Date: Tue, 23 Jul 1996 15:45:21 +0900
Message-ID: <YYYYYYYYYY@***.co.jp>
From: <faxa@***.co.jp>
To: <user1@***.co.jp>
Subject: Received FAX message
Mime-Version: 1.0
Content-Type: text/plain; charset="ISO-2022-JP"
Content-Transfer-Encoding: base 64

TO:[SUB]

[TSI]様からファクシミリ文書を受信しました。
文書はFAXに保管してをります。
パスワードのみを半角模字で入れたファイルをメールで送って下さい。
折り返し配信いたします。
```

FIG. 6

```
Date: Tue, 23 Jul 1996 16:00:15 +0900
Message-ID: <XXXXYYYYY@***.co.jp>
From: <user1@***.co.jp>
To: <faxa@***.co.jp>
Subject: PWD
****
```

FIG. 7

```
Date: Tue, 23 Jul 1996 16:45:21 +0900
Message-ID: <XXXXXXXXXXXXXXX@***.co.jp>
From: <faxa@***.co.jp>
To: <user1@***.co.jp>
Subject: FAX message
Mime-Version: 1.0
Content-Transfer-Encoding: base64

0M8R4KGxGuEAAAAAAAAAAAAAAAAAAAAAOwADAP7/CQAGA
AAAAAAAAAAAAAAABAAAAQAAAAAAAAEAAAAgAAAAEAAAA
D+////AAAAAAAAD/////////////////////////////
```

FIG. 8

TO [TSI]

Reference is made to the facsimile document addressed to [SUB].
The PWD is confirmed and the received document has been duly transferred to [SUB].

FIG. 9

TO [TSI]

Reference is made to the facsimile document addressed to [SUB].
The PWD has not yet been confirmed with [SUB] although [TT1] has elapsed after the document is received.
Therefore, the transfer of the received document has not yet been completed.

FIG. 10

METHOD OF CONTROLLING NETWORK FACSIMILE APPARATUS

BACKGROUND

1. Field of the Invention

The present invention relates to a method of controlling a network facsimile apparatus which is capable of exchanging data over a local area network and exchanging facsimile data over a publicly switched network in accordance with a facsimile transmission procedure, and which is provided with an address conversion table for storing sub-address information including sub-addresses according to the facsimile transmission procedure and corresponding mail addresses in a way that relates each sub-address to its corresponding mail address so that image information received over the publicly switched network may be transmitted via the local area network to a terminal at the mail address corresponding to the sub-address received from a terminal transmitting the image information. The present invention also relates to a network facsimile apparatus that uses such a method and a local area network system including a network facsimile apparatus that uses such a method.

2. Discussion of the Related Art

With increasing and widespread use of local area networks, a facsimile apparatus connected to a local area network for exchanging data over the local area network has been proposed and is widely used today. Such a facsimile apparatus is called a network facsimile apparatus. The network facsimile apparatus includes an address conversion table for storing sub-address information including sub-addresses according to a facsimile transmission procedure and corresponding mail addresses in the local area network system in a way that relates each sub-address to its corresponding mail address. When the network facsimile apparatus receives image information from a remote terminal over a publicly switched network, if the apparatus receives the sub-address of a destination user, the apparatus retrieves the mail address corresponding to the received sub-address from the address conversion table and transfers the received image information to the terminal at the retrieved mail address via the local area network.

A mail address used in a local area network system is generally used for a relatively long period of time by an individual user and instances may occur in which the mail address is stolen and used by a third party. If a certain mail address is stolen and used by a user other than the legitimate user of the mail address and if a facsimile document destined for the legitimate user of the mail address is received by the network facsimile apparatus over a publicly switched network and is transferred to the terminal at the mail address via the local area network as described above, it may result in the facsimile document being delivered to an unintended recipient, with the intended recipient failing to receive the facsimile document.

Therefore, a need exists for an improved method of controlling the network facsimile apparatus so as to more securely deliver image information received over a publicly switched network to the destined recipient via a local area network and to avoid delivering the received information to an unintended recipient.

SUMMARY

The present application provides a method of controlling a network facsimile apparatus to more securely deliver image information received over a publicly switched network to a destined recipient via a local area network and to avoid delivering the received image information to an unintended recipient. The method controls a network facsimile apparatus which is capable of exchanging data over a local area network and exchanging facsimile data over a publicly switched network in accordance with a facsimile transmission procedure, and which includes an address conversion table for storing sub-address information including sub-addresses according to the facsimile transmission procedure and corresponding mail addresses in a way that relates each sub-address to its corresponding mail address so that image information received over the publicly switched network may be transmitted via the local area network to a terminal at the mail address corresponding to a sub-address received from a transmitting terminal when the image information is received by the apparatus.

One embodiment of the method according to the present application includes registering password information corresponding to each of the sub-addresses of the sub-address information in the address conversion table. If the network facsimile apparatus is informed of a received sub-address and corresponding password information in accordance with a pre-message procedure of the facsimile transmission procedure when image information is received from a transmitting terminal, the network facsimile apparatus sends an electronic mail message indicating receipt of the image information and requesting password information from a terminal at a mail address registered in the address conversion table corresponding to the received sub-address. When a response electronic mail message with password information is received from the terminal at the mail address, the apparatus checks if the password information contained in the received response mail message accords with password information registered in the address conversion table corresponding to the mail address. If the password information contained in the received response mail message accords with the password information registered in the address conversion table corresponding to the mail address, the apparatus then sends an electronic mail message transferring the received image information to the terminal at the mail address.

If the apparatus receives a Transmitting Subscriber Identification signal according to the facsimile transmission procedure when the image information from the transmitting terminal is received, a status report on the transfer of the received image information to the terminal at the mail address is generated and a call is made to a destination designated in the Transmitting Subscriber Identification signal to transmit image information of the status report to the designated destination.

Further, when the electronic mail message transferring the received image information has not been transmitted to the terminal at the mail address within a predetermined period of time after the image information is received by the apparatus, the status report may include a message indicating that the received image information has not been transferred to the terminal at the mail address.

In the method, a protocol signal defined in a Group 3 facsimile transmission procedure may preferably be utilized for informing the apparatus of sub-address information and password information.

BRIEF DESCRIPTION OF THE DRAWINGS

A more complete appreciation of the present invention and many of the attendant advantages thereof will be readily obtained by reference to the following detailed description when considered in connection with the accompanying drawings, wherein:

FIG. 5 is a chart showing an example of an address conversion table according to the present application;

FIG. 6 shows an example of an electronic mail message informing a destination user of the receipt of image information and requesting the user for password information;

FIG. 7 shows an example of an electronic mail message with password information for responding to the electronic mail message shown in FIG. 6;

FIG. 8 shows an example of an electronic mail message transferring received image information to the destination user;

FIG. 9 shows an example of a report informing the user at the transmitting terminal that the received image information has been transferred to the destination user;

FIG. 10 shows an example of a report informing that the received image has not been transferred to the destination user.

DETAILED DESCRIPTION

Figure 1:
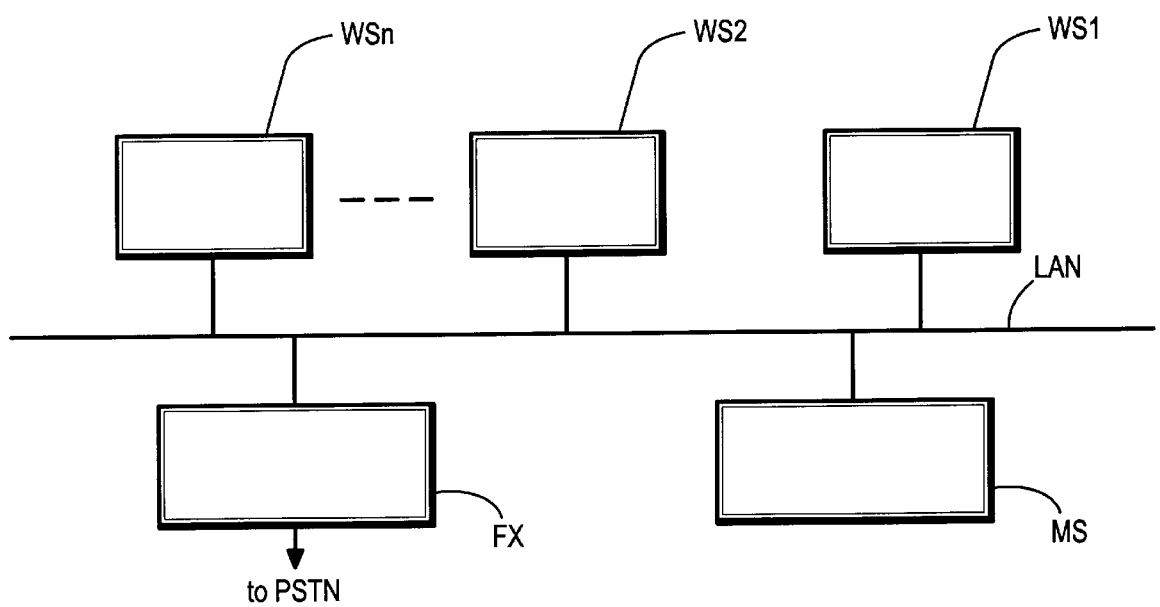
FIG. 1 is a block diagram showing an example of a local area network system according to the present application.

Referring now to the drawings, wherein like reference numerals designate identical or corresponding parts throughout the several views, embodiments of the present invention are explained herein below.

FIG. 1 shows a block diagram of a local area network system according to the present application, in which a plurality of work stations WS1 to WSn, a mail server MS and a facsimile apparatus FX are connected to a local area network LAN.

The mail server MS provides the work stations WS1 to Wsn and the facsimile apparatus FX with distribution and collection services of electronic mail messages.

The work stations WS1 to WSn are provided with application software for exchanging data with each other over the local area network LAN and software for processing image information included in an electronic mail message received from the facsimile apparatus FX. Each of the work stations WS1 to WSn is generally used by one or more specified users.

The facsimile apparatus FX is capable of exchanging data with other terminals over the local area network LAN. The apparatus FX is also connected with a publicly switched network and is capable of transmitting image information in accordance with, for example, a Group 3 facsimile transmission procedure, over the publicly switched network. The apparatus FX exchanges image information as an electronic mail message over the local area network LAN.

In this embodiment, each of the work stations WS1 to WSn, the facsimile apparatus FX and the mail server MS use a protocol suit including the transmission protocol covering the transport layer called TCP/IP and communication protocols covering the upper layers for exchanging data with each other over the local area network LAN. A communication protocol known as a Simple Mail Transfer Protocol (SMTP) is used as the upper layer protocol to exchange electronic mail data.

An electronic mail message is first stored in the mail server MS and is then delivered to a destination terminal. Namely, an electronic mail message from the facsimile apparatus FX to a user at the work station WS1, for example, is first stored in the mail server MS. Each of the work stations WS1 to WSn issues an inquiry at an appropriate interval to the mail server MS for checking if there is an electronic mail message destined for the user of the inquiring terminal. If an electronic mail message destined for the user of the inquiring terminal is stored in the mail server MS, the inquiring terminal retrieves and receives the mail message from the mail server MS and informs the user of the inquiring terminal of the reception of mail. The user then can view or print the content of the mail as desired. If binary data such as facsimile image information is included in the mail, the user can activate appropriate software for processing the binary data.

The Post Office Protocol (POP) is used by each of the terminals or apparatus connected to the local area network LAN for inquiring the mail server MS about receipt of electronic mail messages addressed to the user of the inquiring terminal or apparatus and for retrieving the received electronic mail messages from the mail server MS.

The communication protocols such as TCP/IP, SMTP and POP, and data format and data construction of electronic mail messages are prescribed in the Requests for Comment (RFC) issued by the Internet Engineering Task Force (IETF) which governs technologies related to the Internet. For example, the TAP is prescribed in RFC 793, the IP in RFC 793, the SMTP in RFC 821 and the format of electronic mail in RFC 822, RFC 1341 and RFC 1342, and the POP in RFC 1725.

Figure 2:
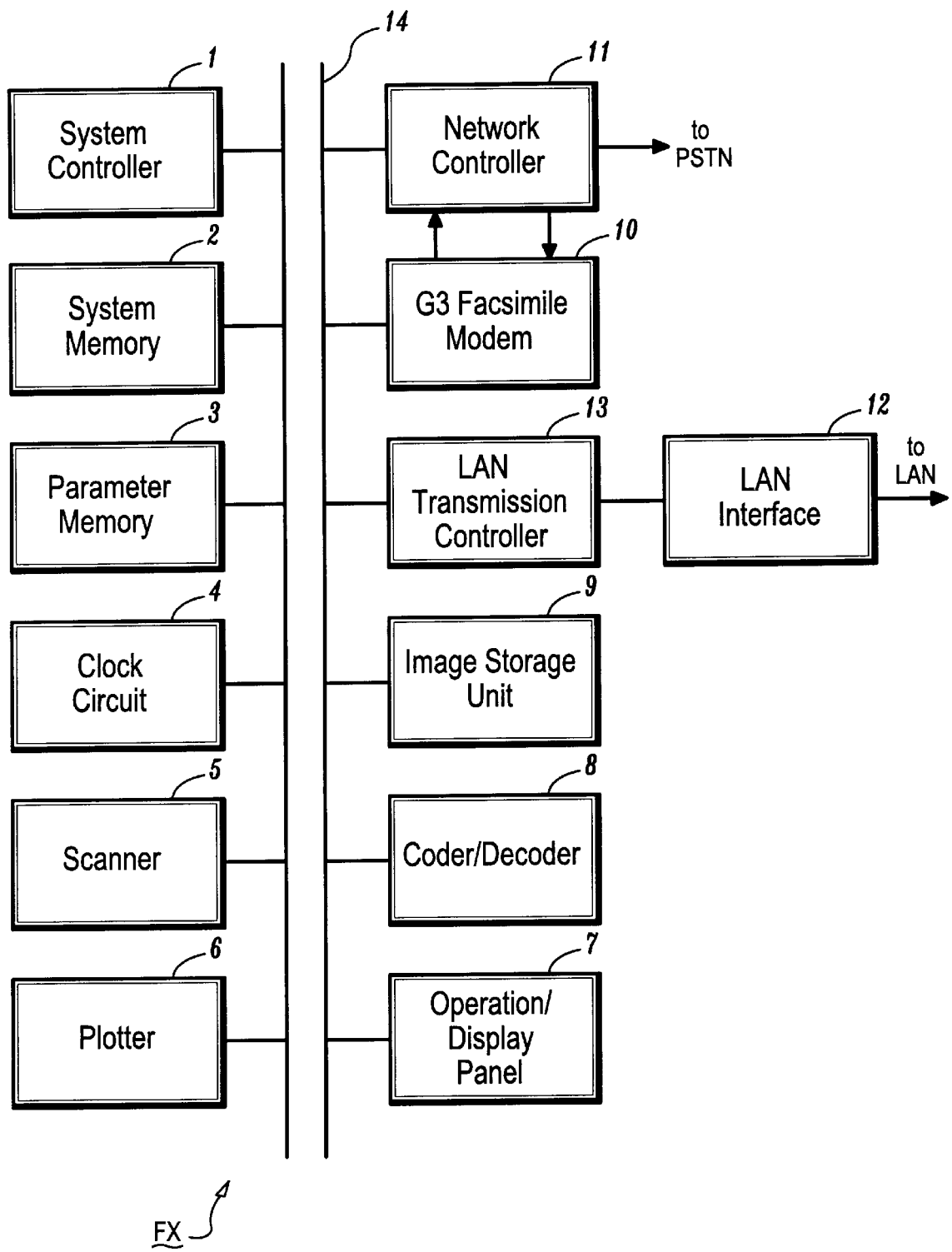
FIG. 2 is a block diagram showing an example of a construction of a network facsimile apparatus according to the present application.

FIG. 2 shows an example of a construction of the facsimile apparatus FX. In the drawing, a system controller 1 controls each part of the facsimile apparatus FX and executes various processes including the process for the facsimile transmission procedure. The system controller 1 also executes a process of controlling the facsimile apparatus FX according to the present application. A system memory 2 stores programs of the processes executed by the system controller 1 and various data needed when each of the programs is executed. The system memory 2 also includes a work area for the system controller 1. A parameter memory 3 stores information assigned specifically to this facsimile apparatus FX. A clock circuit 4 outputs a current time.

A scanner 5 reads an image of an original document for transmission at an prescribed resolution. A plotter 6 records and outputs an image at a prescribed resolution on a recording sheet. An operation/display panel 7 includes operation keys that permit the operator to actuate various operations and displays for displaying operating conditions of the apparatus and messages to the operator.

A coder/decoder 8 encodes an image signal for compressing image information and decodes compressed image information to the original image signal. A image storage unit 9 stores compressed image information.

A Group 3 facsimile modem 10 is provided for implementing the Group 3 facsimile modem function and includes a low-speed modem, such as, for example, a V.21 modem, for exchanging transmission procedure signals, and a high-speed modem, such as, for example, a V.17 modem, a V.34 modem, a V.29 modem or a V.27ter modem, for primarily exchanging image information.

A network controller 11 connects the facsimile apparatus FX to a publicly switched network and includes an automatic call originating and receiving function.

A local area network interface 12 connects the facsimile apparatus FX to the local area network LAN. A local area network transmission controller 13 processes the communication control in accordance with prescribed protocols for exchanging various data with other terminals over the local area network LAN.

The system controller 1, the system memory 2, the parameter memory 3, the clock circuit 4, the scanner 5, the plotter 6, the operation/display panel 7, the coder/decoder 8, the network controller 11 and the local area network transmission controller 13 are connected to an internal bus 14. Data are exchanged between these elements over the internal bus 14.

The network controller 11 and the Group 3 facsimile modem 10 directly exchange data with each other.

The facsimile apparatus FX further includes an address conversion table storing sub-address information including sub-addresses according to the facsimile transmission procedure, mail addresses, each of which is associated with a specific sub-address of the sub-address information, and password information prescribed to each mail address, in a way that interrelates with each other. This address conversion table enables the facsimile apparatus FX to transmit, via the local area network LAN, image information received over a publicly switched network to a terminal at a mail address corresponding to a sub-address received from a transmitting terminal upon receiving the image information. The password information stored in the table is used for verifying the user of the terminal at the mail address, which will be described later. The address conversion table is stored in the system memory 11.

Figure 3:
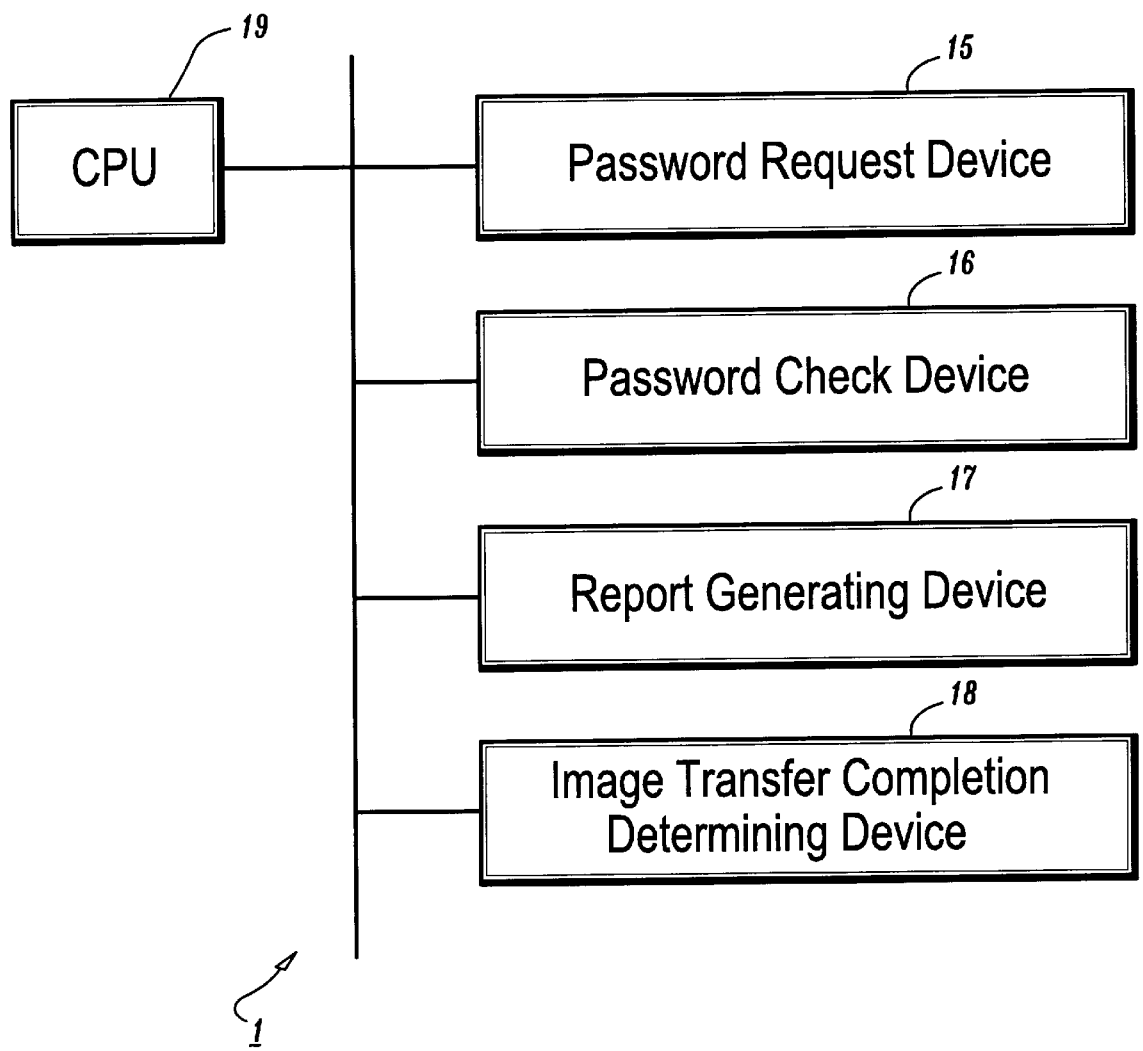
FIG. 3 is a functional block diagram showing an example of a structure of a system controller of the network facsimile apparatus shown in FIG. 2.

FIG. 3 shows an example of a structure of the system controller 1 of the network facsimile apparatus FX. As shown in the drawing, the system controller 1 includes a password request device 15. If the apparatus FX is informed of a sub-address and corresponding password information in accordance with a pre-message procedure of a facsimile transmission procedure when image information is received from a transmitting terminal, the password request device 15 sends an electronic mail message informing of receipt of image information and requesting password information from a terminal at a mail address registered in the address conversion table corresponding to the sub-address received from the transmitting terminal. The system controller 1 further includes a password check device 16 which checks, when a response electronic mail message with password information is received from the terminal at the mail address, if the password information contained in the received response mail message accords with the password information registered in the address conversion table corresponding to the mail address. If the password information contained in the received response mail message accords with the password information registered in the address conversion table corresponding to the mail address, then the password check device 16 sends an electronic mail message transferring the received image information to the terminal at the mail address.

The system controller 1 further includes a report generating device 17. If the apparatus FX receives a Transmitting Subscriber Identification signal according to the facsimile transmission procedure when the image information is received from the transmitting terminal, the report generating device 17 generates a status report on the transfer of the received image information to the terminal at the mail address and originates a call to a destination designated in the Transmitting Subscriber Identification signal to transmit image information of the report to the destination.

The system controller 1 also includes an image transfer completion determining device 18 which determines if the electronic mail message transferring the received image information to the terminal at the mail address is sent within a predetermined period of time after the image information is received by the apparatus FX. If the electronic mail message transferring the received image information to the terminal at the mail address has not been sent within the predetermined period of time after the image information is received by the apparatus FX, the report includes a message indicating that the transfer of received image information to the terminal at the mail address has not yet been completed.

The network facsimile apparatus FX utilizes a Sub-address signal SUB and a Password signal PWD according to a facsimile transmission procedure, such as for example, the Group 3 facsimile transmission procedure, for informing the receiving terminal of the sub-address and password information of the destination user.

The network facsimile FX may alternatively utilize a Transmitting Subscriber Identification TSI signal according to the facsimile transmission procedure for informing the receiving terminal of the sub-address and password information of the destination terminal. The TSI signal normally includes the telephone number of the transmitting facsimile apparatus and an identification of the facility where the apparatus is located such as, for example, a company name or the like.

Figure 4A:
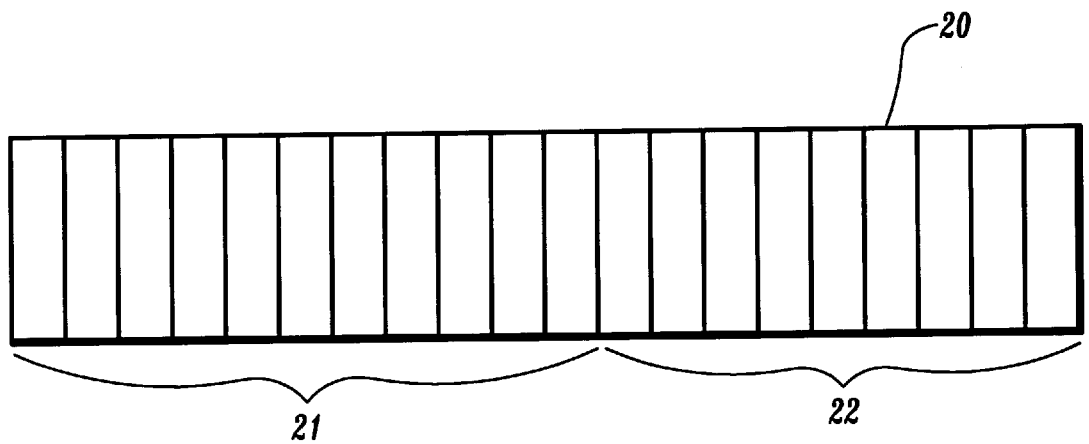
FIG. 4(a) is a diagram showing a typical TSI data field according to a facsimile transmission procedure.

FIG. 4a shows a typical TSI data field. As shown in the drawing, a TSI data field 20 may be a 20-character long data field including a sub-field 21 for a telephone number and a sub-field 22 for facility identification.

Figure 4B:
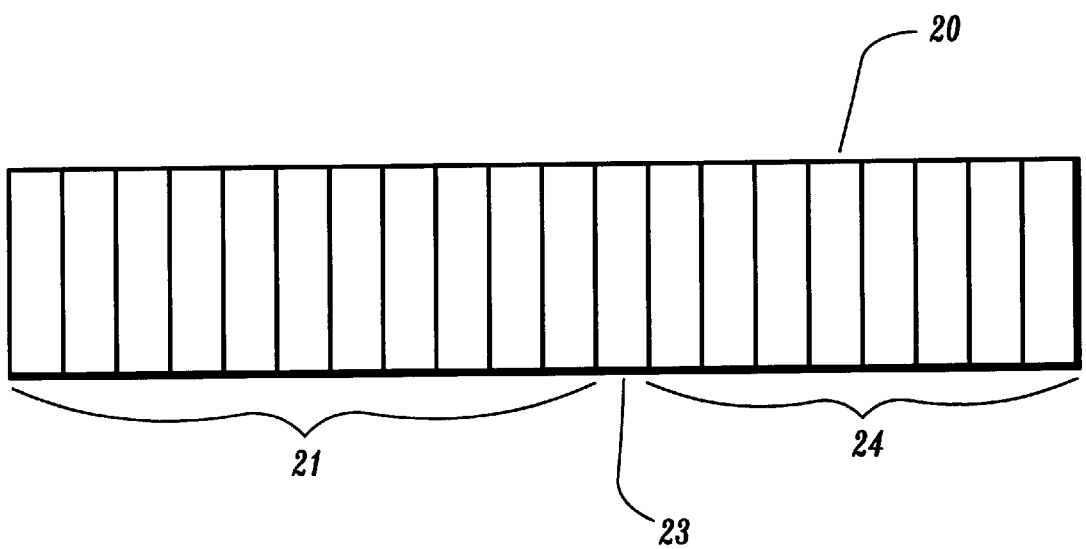
FIG. 4(b) is a diagram showing an example of a TSI data field modified to include sub-address information and password information according to the present application.

FIG. 4b shows an example of a TSI data field including a sub-address and password information. The TSI data field 20 is modified to include a new sub-field 24 which carries a character string representing the sub-address and password information of a destination user. In the example, a first four-character string represents the sub-address and a second four-character string represents the password information of the destination user. This field is commenced with a sub-field 23 for a unique control character, such as the asterisk mark (*) or the pound sign (#), which allows the receiving terminal to recognize the end of the telephone number and the start of the sub-address and the password information of the destination user.

Character codes representing the sub-address and the password information may be entered through the operation keys provided in the operation/display panel 7 of the apparatus FX. The asterisk mark and the pound sign may be programmed through a standard DTMF or touch tone telephone keypad.

The sub-address and the password information may be then stored in a memory in such a way to be related with a destination telephone number and may be recalled from the memory to replace data in the TSI data field as required when facsimile communication is commenced by the apparatus FX.

Figure 5:
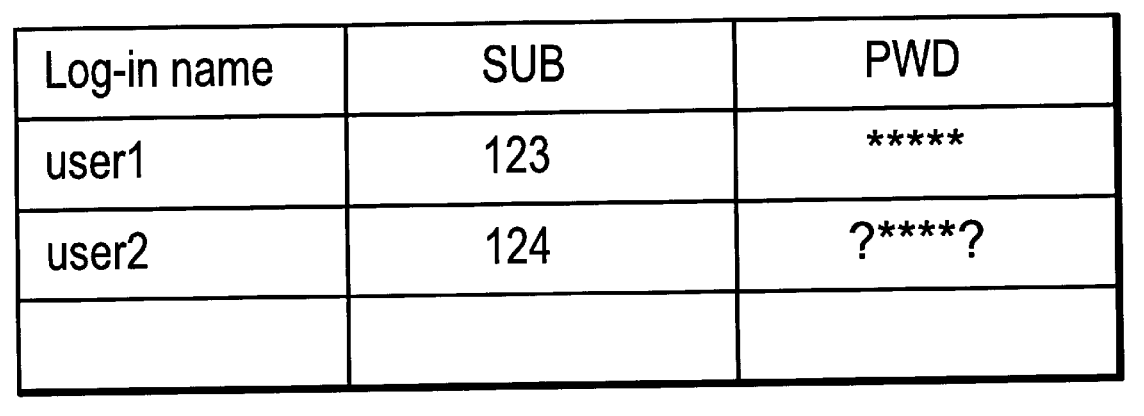

FIG. 5 shows an example of the address conversion table. As shown in the drawing, the address conversion table stores a log-in name of a user as a mail address of the user, sub-address information comprised of sub-addresses and password information, in sets of these three elements.

In this example, a user registered in the same local area network LAN as the transmitting terminal is designated as the destination user and therefore a log-in name of the user is used as the mail address of the user. The name of the local area network LAN is "*.co.jp" in this example, and therefore the mail address of the user is represented as "log-in name@*.co.jp".

When the facsimile apparatus FX receives image information, for example, from a remote terminal over the publicly switched network, the apparatus FX stores the received image information in the image storage unit 9, as shown in FIG. 2. If the sub-address and the password information of the destination user are received from the transmitting terminal when the image information is received, then the facsimile apparatus FX sends an electronic mail message to the destination user at the mail address corresponding to the received sub-address informing the destination user of the receipt of image information and requesting password information.

FIG. 6 is an example of an electronic mail message sent to the destination user at the mail address corresponding to the received sub-address informing of the receipt of image information. It indicates that the mail message is addressed to the mail address of "user1@*.co.jp" from the facsimile apparatus FX at the mail address of "faxa@*.co.jp".

An electronic mail message generally contains header information and a message body. The header information includes a "Date" field for setting the date and time of transmission, a "Message-ID" field for setting information for identifying the electronic mail message, a "From" field for indicating the name of originator of the mail, a "To" field for indicating the destination mail address, and a "Subject" field for indicating the title of the message.

In the example shown in FIG. 6, the date and time of transmission is indicated as "Tue., Jul. 23, 1996 15:45:21 +0900 (indicating Japan Standard Time)", and the electronic mail message identification information is indicated as "<YYYYYYYYYYYY@*.co.jp>". The originator of the mail is indicated as "<faxa@*.co.jp>" and the destination mail address is indicated as "user1@***.co.jp". In the "Subject" field, a message indicating "Received FAX message" is shown.

The message body of the electronic mail message is required to be readable information in 7-bit code. Therefore, when the message information is constructed of 16-bit code, for example, as in Japanese characters, the information can not be directly sent. In the example shown in the drawing, because the message body is made of Japanese characters constructed of 16-bit code, the message information is converted to information conforming to the format of Multipurpose Internet Mail Extensions (MIME), which is prescribed in RFC 1341 and RFC 1342.

Accordingly, the header information of this example includes a "MIME-Version" field for indicating that the message body is in the MIME format, a "Content-Type" field for indicating the type of information contained in the message body, and a "Content-Transfer-Encoding" field for indicating the encoding type used for the message body.

The example in FIG. 6 shows that the MIME version is "1.0", the content of the message body contains plain text information constructed with the character set of "ISO-2022-JP", and the "base 64" encoding system is used for encoding the message body.

Although the drawing shows in the message body Japanese characters indicating a message informing of the receipt of the image information and requesting password information, MIME information which is generated by encoding the same Japanese characters according to the base 64 system is disposed in the message body.

The user receiving the electronic mail message then sends back an electronic mail message with the password information to the facsimile apparatus FX.

FIG. 7 shows an example of an electronic mail sent from the destination user back to the facsimile apparatus FX for informing of password information.

As shown in the drawing, "PWD" is set in the "Subject" field indicating that the mail includes password information, and the content of the password information is set in the message body.

The facsimile apparatus FX then retrieves the password information included in the message body of the received electronic mail message and compares the retrieved password information with the password information registered in the address conversion table. If they accord, the facsimile apparatus FX transmits the received image information to the destination user in the form of an electronic mail message.

FIG. 8 shows an example of an electronic mail message transferring the received image information as an electronic mail message to the destination user at the mail address corresponding to the received sub-address.

Because image information is binary data, the image information is converted into the information in the MIME format. Accordingly, the header information of the mail includes the "MIME-Version" field and the "Content-Transfer-Encoding" field, and in the message body the MIME information generated by encoding the received image information according to the base 64 encoding system is disposed.

After sending the received image information to the destination user at the mail address, the facsimile apparatus FX generates a status report as shown in FIG. 9 informing of the completion of the transfer of the received image information. The facsimile apparatus FX transmits a facsimile image of the status report to the transmitting terminal to notify that the transfer of the received image to the destination user has been completed.

In FIG. 9, the content of the Transmitting Subscriber Identification TSI which is received from the transmitting terminal is set in a "TSI" field, and the sub-address received as a destination address is set in a "SUB" field. The telephone number to be called is determined based upon the content of the Transmitting Subscriber Identification TSI.

If the facsimile apparatus FX does not receive the electronic mail message with the password information from the destination user within a predetermined period of time TT1 such as, for example, one hour after sending the electronic mail message informing of the receipt of image information and requesting password information, then the facsimile apparatus FX generates a status report indicating that the transfer of the received image information to the destination user has not been completed, as shown in FIG. 10. The facsimile apparatus FX transmits the report to the transmitting terminal to notify the user of the transmitting terminal that the transfer of the received image information to the destination user has not been completed.

In FIG. 10, the content of the Transmitting Subscriber Identification TSI received from the transmitting terminal is set in the "TSI" field, the content of the specified sub-address is set in the "SUB" field and a period of time prescribed as the predetermined period of time TT1 in the "TT11" field.

Figure 11:
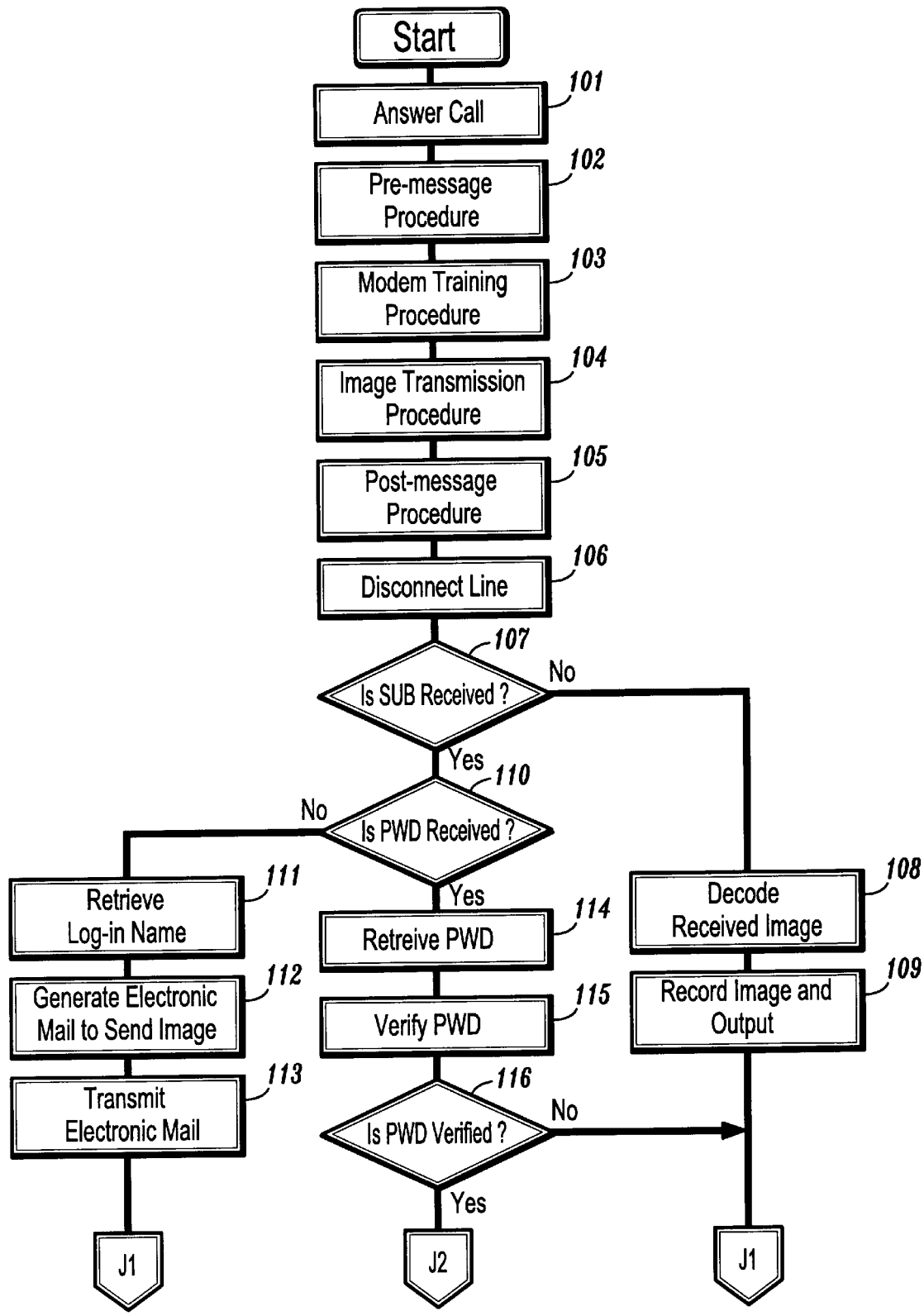
FIGS. 11, 12 and 13 are flowcharts illustrating an example of a process of controlling the network facsimile apparatus according to the present application.
Figure 12:
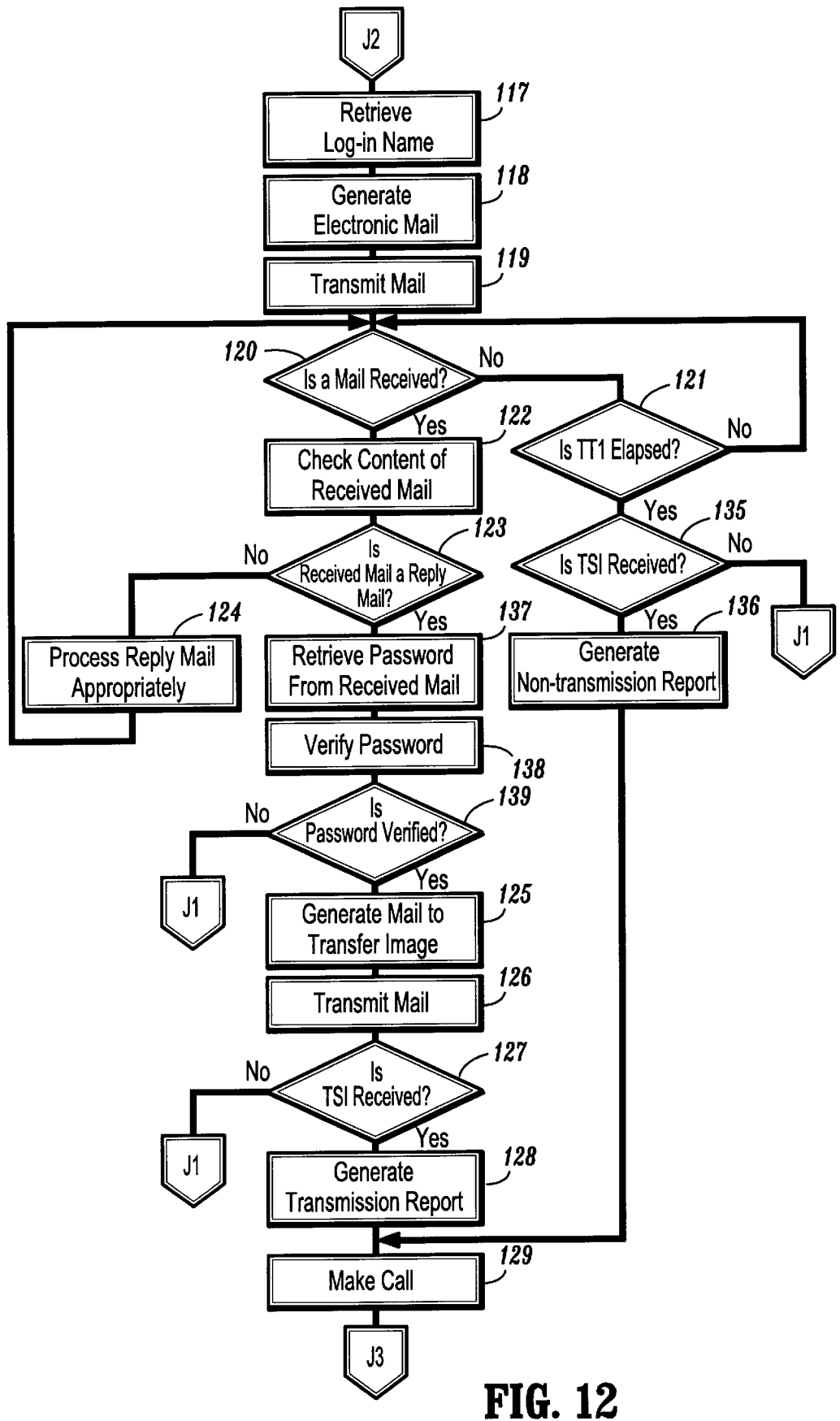
Figure 13:
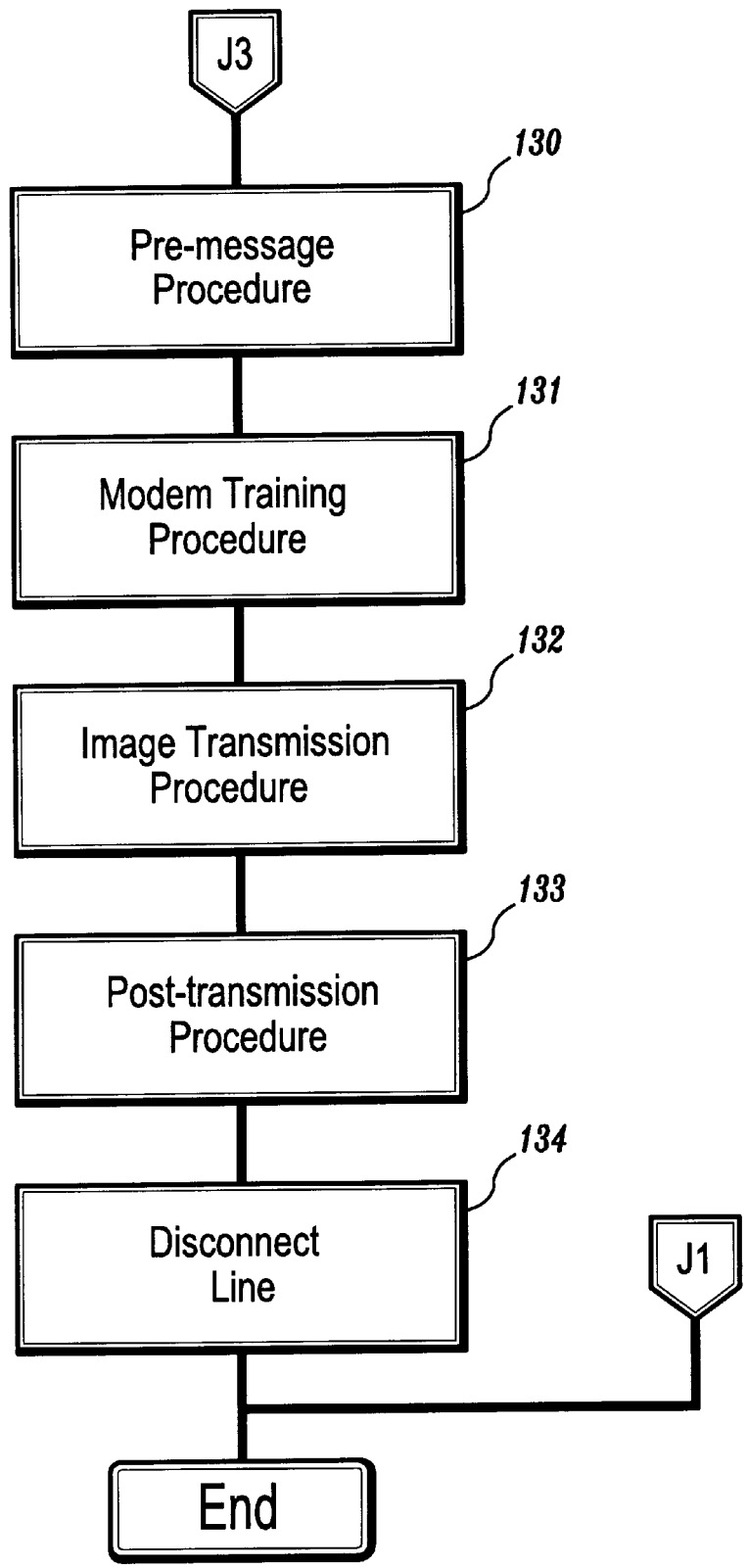

Now, an example of a control process of the facsimile apparatus FX according to the present application is explained, with reference to FIGS. 11, 12 and 13.

When the facsimile apparatus FX detects arrival of an incoming call with the network controller 11, the facsimile apparatus FX answers the call (step 101), establishes a connection with the calling terminal, executes a predetermined pre-message procedure and sets transmission conditions necessary for communicating image information with the calling terminal (step 102). If the facsimile apparatus FX receives a sub-address signal SUB, a password signal PWD and a Transmitting Subscriber Identification TSI during this pre-message procedure, the apparatus FX stores the contents of these signals in a memory (not shown) in the system controller 1.

Then, the modem training procedure is executed (step 103) to determine the modem speed to be used. The facsimile apparatus FX then executes a prescribed Group 3 facsimile receiving procedure to receive the image information and stores the received image information in the image storage unit 9 (step 104).

After the completion of receipt of the image information, a prescribed post-transmission procedure is executed (step 105) and the line is disconnected (step 106) to end the process of receiving image information.

The facsimile apparatus FX then checks if a sub-address signal SUB has been received from the transmitting terminal (step 107). If the sub-address signal SUB has not been received and the answer in step 107 is No, the apparatus FX decodes the image information stored in the image storage unit 9 with the coder/decoder 8 to the original image data (step 108). The image data is then transferred to the plotter 6 to be recorded on a recording sheet and outputted (step 109). Then, the process of receiving image information ends.

If the sub-address signal SUB has been received from the transmitting terminal and the answer in step 107 is Yes, a determination is made as to whether a password signal PWD has been received (step 110).

If the password signal PWD has not been received and the answer in step 110 is No, the facsimile apparatus FX retrieves the log-in name stored in the address conversion table corresponding to the received sub-address signal SUB (step 111). The apparatus FX then converts the image information stored in the image storage unit 9 to the information of the MIME format with the base 64 encoding system and generates an electronic mail message for transferring the MIME format image information to the terminal at the mail address represented by the log-in name (step 112). The electronic mail message is then sent to the mail server MS via the local area network LAN (step 113).

If the password signal PWD is received from the transmitting terminal and the answer in step 110 is Yes, the password information corresponding to the received sub-address signal SUB is retrieved from the address conversion table (step 114) and a verification is made as to whether the retrieved password information accords with the content of the received password signal PWD (step 115). If the retrieved password information does not accord with the content of the received password signal PWD and the answer in step 116 is No, the process is discontinued. Accordingly, the received image information will not be transferred to the terminal at the mail address corresponding to the sub-address specified by the received sub-address signal SUB.

If the retrieved password information accords with the content of the received password signal PWD and the answer in step 116 is Yes, the apparatus FX retrieves the mail address represented by the log-in name stored in the address conversion table corresponding to the sub-address specified by the received sub-address signal SUB (step 117). The apparatus FX then generates an electronic mail message informing the destination user of the receipt of image information and requesting password information (step 118) and transmits the mail message to the terminal at the mail address (step 119).

After the above mail is transmitted to the destination user, the facsimile apparatus FX monitors and checks if an electronic mail message is received within a predetermined period of time TT1 (steps 120 and 121) from the destination user.

When an electronic mail message is received within the predetermined period of time TT1 and the answer in step 120 is Yes, a determination is made as to whether the received mail is a reply mail message with the password information (steps 122 and 123). If the received mail message is not a reply mail message, an appropriate process is executed (step 124) and the process returns to step 120.

If the received mail is a reply mail message, the facsimile apparatus FX converts the image information stored in the image storage unit 9 to the MIME format image information with the base 64 encoding system and generates an electronic mail message for sending the MIME format image information to the terminal at the retrieved mail address represented by the log-in name (step 125). The apparatus FX then transmits the mail message to the mail server MS on the local area network LAN (step 126).

After completing transfer of the received image information, a determination is made as to whether the Transmitting Subscriber Identification TSI has been received from the transmitting terminal (step 127). If the Transmitting Subscriber Identification TSI has not been received and the answer in step 127 is No, the process ends.

If the Transmitting Subscriber Identification TSI has been received and the answer in step 127 is Yes, the above-described status report informing of the completion of the transfer of the received image information to the destination user is generated (step 128).

Then, the apparatus FX makes a call to the telephone number included in the Transmitting Subscriber Identification TSI (step 129) for transmitting a facsimile image of the status report to the transmitting terminal over the publicly switched network. When the called terminal answers the call, a prescribed pre-message transmission procedure is executed to set the transmission conditions necessary for communicating the image information of the status report to the called terminal (step 130) and a prescribed modem training procedure is executed to determine the modem speed to be used (step 131). Then, the prescribed Group 3 facsimile transmission procedure is executed to transmit the image information of the status report (step 132).

After completing the transmission of the image information of the status report, the prescribed post-transmission procedure is executed (step 133), the line is disconnected (step 134) and the process of transmitting the image information of the status report ends.

If the reply mail message is not received within the predetermined period of time TT1 after the electronic mail message informing of the receipt of image information is transmitted and the answer in step 121 is Yes, a determination is made as to whether the Transmitting Subscriber Identification TSI has been received from the transmitting terminal (step 135). If the Transmitting Subscriber Identification TSI has not been received and the answer in step 135 is No, the process ends.

If the Transmitting Subscriber Identification TSI has been received and the answer in step 135 is Yes, the status report informing that the received image information has not been transferred to the destination user is generated (step 136).

The process then proceeds to the step 129 to make a call to the telephone number contained in the Transmission Subscriber Identification TSI and executes the subsequent procedures for transmitting the image information of the status report to the transmitting terminal.

Thus, in this embodiment, when the sub-address signal SUB and the password signal PWD are received from the transmitting terminal when the image information is received, the received image information is transferred to the terminal at the mail address corresponding to the sub-address specified by the received sub-address signal SUB only when the password received from the destination user accords with the password registered in the address conversion table corresponding to the sub-address. Therefore, even if a certain mail address is stolen and used by a user other than the legitimate user of the mail address and a facsimile document destined to the legitimate user of the mail address is received over a publicly switched network by the network facsimile apparatus, the received image information will not be transferred to the terminal at the mail address unless the user of the terminal at the mail address can verify the password. Thus, the network facsimile apparatus according to the present application can securely transfer received image information to the destined user and can avoid delivering information to an unintended recipient.

Further, when only the sub-address signal SUB is received and the password signal PWD is not received from the transmitting terminal, the received image information is transferred to the mail address corresponding to the sub-address specified by the received sub-address signal SUB without verification of the password. Therefore, depending upon the level of the security required for the information, the user can selectively set, when transmitting image information to a destination user, both the sub-address signal SUB and the password signal PWD or only the sub-address signal SUB.

Furthermore, the user on the transmitting side can know the status of the transmitted image information by receiving the status report informing of the status of the transfer of the received image information to the destination user.

In the above embodiment, one unit of the facsimile apparatus FX is included in one local area network LAN. However, the present application can also be applied to a local area network system where a plurality of facsimile apparatus FX are provided for one local area network LAN.

Further, protocols for exchanging an electronic mail message other than the protocol used in the embodiment can be used.

Numerous additional modifications and variations of the present invention are possible in light of the above teachings. It is therefore to be understood that within the scope of the appended claims, the present invention may be practiced other than as specifically described herein.

This application is based upon Japanese patent application No.08-340399 filed in the Japanese Patent Office on Dec. 6, 1996, the entire contents of which is hereby incorporated by reference.

What is claimed is:

1. A method of controlling a network facsimile apparatus, the method comprising the steps of:

connecting the network facsimile apparatus to a local area network for exchanging data over the local area network;

connecting the network facsimile apparatus to a publicly switched network for exchanging facsimile data over the publicly switched network in accordance with a facsimile transmission procedure;

providing an address conversion table for storing sub-address information including a plurality of sub-addresses according to the facsimile transmission procedure and a plurality of mail addresses respectively corresponding to the plurality of sub-addresses in a way that relates each of the plurality of sub-addresses to a corresponding mail address in order to transmit image information received over the publicly switched network via the local area network to a terminal at a mail address corresponding to a sub-address received when the image information is received from a transmitting terminal;

storing password information corresponding to each of the plurality of sub-addresses of the sub-address information in the address conversion table;

comparing password information received with and corresponding to the received sub-address, to stored password information corresponding to the sub-address information stored in the address conversion table;

sending an electronic mail message notifying of receipt of the image information and requesting password information from the terminal at the mail address in the address conversion table corresponding to the received sub-address when the received password information corresponding to the received sub-address received from the transmitting terminal corresponds to the stored password information; and if a response electronic mail message with password information is received from the terminal at the mail address corresponding to the received sub-address, checking if the password information in the received response accords with password information stored in the address conversion table for the mail address corresponding to the received sub-address and transferring the received image information to the terminal at the mail address by way of an electronic mail message if the password information in the received response accords with the password information stored in the address conversion table for the mail address corresponding to the received sub-address.

2. The method of controlling a network facsimile apparatus according to claim 1, further comprising the step of:

generating a status report on a transfer status of the received image information to the terminal at the mail address and originating a call to a destination included in a Transmitting Subscriber Identification signal received when the image information is received to transmit image information of the status report to the destination.

3. The method of controlling a network facsimile apparatus according to claim 2, wherein, if the electronic mail message transferring the received image information to the terminal at the mail address is not sent within a predetermined period of time after the image information is received by the facsimile apparatus, the status report includes a message indicating that the received image information has not been transferred to the terminal at the mail address.

4. The method of controlling a network facsimile apparatus according to claim 1, wherein the sub-address and password information are transmitted to the network facsimile apparatus using a protocol signal defined according to a Group 3 facsimile transmission procedure.

5. The method of controlling a network facsimile apparatus according to claim 4, wherein the protocol signal includes a Transmitting Subscriber Identification signal.

6. The method of controlling a network facsimile apparatus according to claim 4, wherein the protocol signal includes a Sub-address signal and a Password signal.

7. A local area network system, comprising:

a local area network;

a terminal connected to the local area network;

a mail server connected to the local area network, the mail server providing an electronic mail service to the terminal connected to the local area network; and a network facsimile apparatus connected to the local area network, the network facsimile apparatus including:

a publicly switched network connecting device for connecting the network facsimile apparatus to a publicly switched network in order to exchange facsimile data over the publicly switched network in accordance with a facsimile transmission procedure, an address conversion table device for storing sub-address information including a plurality of sub-addresses according to the facsimile transmission procedure and a plurality of mail addresses respectively corresponding to the plurality of sub-addresses in a way that relates each of the plurality of sub-addresses to a corresponding mail address in order to transmit image information received over the publicly switched network via the local area network to a terminal at a mail address corresponding to a sub-address received when the image information is received from a transmitting terminal, and for storing password information corresponding to each of the plurality of the sub-addresses, a comparator for comparing password information received with and corresponding to the received sub-address, to stored password information corresponding to the sub-address information stored in the address conversion table, a password request device for sending an electronic mail message notifying of receipt of the image information and requesting password information from the terminal at the mail address corresponding to the received sub-address when the received password information corresponding to the received sub-address corresponds to the stored password information, and a password check device for checking if password information in a received response mail message from the terminal at the mail address accords with the password information stored in the address conversion table device corresponding to the received sub-address and, if the password information in the received response mail message accords with the password information stored in the address conversion table device corresponding to the mail address, for transferring the received image information to the terminal at the mail address by way of an electronic mail message.

8. The local area network system according to claim 7, wherein the network facsimile apparatus further includes a report generating device for generating a status report on a transfer status of the received image information to the terminal at the mail address and for originating a call to a destination included in a Transmission Subscriber Identification signal received when the image information is received to transmit image information of the status report to the destination.

9. The local area network system according to claim 8, wherein the network facsimile apparatus further includes an image information transfer completion determining device for determining if the electronic mail message transferring the received image information to the terminal at the mail address has been sent within a predetermined period of time after the image information is received, wherein if then electronic mail message transferring the received image information to the terminal at the mail address has not been sent within the predetermined period of time after the image information is received, the status report includes a message indicating that the received image information has not been transferred to the terminal at the mail address.

10. The local area network system according to claim 7, wherein the sub-address and the password information are transmitted using a protocol signal defined according to a Group 3 facsimile transmission procedure.

11. The local area network system according to claim 10, wherein the protocol signal includes a Transmitting Subscriber Identification signal.

12. The local area network system according to claim 10, wherein the protocol signal includes a Sub-address signal and a Password signal.

13. A network facsimile apparatus, comprising:

means for connecting the network facsimile apparatus to a local area network in order to exchange data over the local area network;

means for connecting the network facsimile apparatus to a publicly switched network in order to exchange facsimile data over the publicly switched network in accordance with a facsimile transmission procedure;

address conversion table means for storing sub-address information including a plurality of sub-addresses according to the facsimile transmission procedure and a plurality of mail addresses respectively corresponding to the plurality of sub-addresses in a way that relates each of the plurality of sub-addresses to a corresponding mail address in order to transmit image information received over the publicly switched network via the local area network to a terminal at a mail address corresponding to a sub-address received when the image information is received from a transmitting terminal, and for storing password information corresponding to each of the plurality of sub-addresses;

means for comparing password information received with and corresponding to the received sub-address, to stored password information corresponding to the sub-address information stored in the address conversion table means;

means for sending an electronic mail message notifying of receipt of the image information and requesting password information from the terminal at the mail address corresponding to the received sub-address when the received password information corresponding to the received sub-address received from the transmitting terminal corresponds to the stored password information; and means for checking if password information in a received response mail message from the terminal at the mail address accords with the password information stored in the address conversion table corresponding to the received sub-address and, if the password information in the received response mail message accords with the password information stored in the address conversion table means, for transferring the received image information to the terminal at the mail address by way of an electronic mail message.

14. The network facsimile apparatus according to claim 13, further comprising means for generating a status report on a transfer status of the received image information to the terminal at the mail address and originating a call to a destination included in a Transmission Subscriber Identification signal received when the image information is received to transmit image information of the status report to the destination.

15. The network facsimile apparatus according to claim 14, further comprising means for determining if the electronic mail message transferring the received image information to the terminal at the mail address has been sent within a predetermined period of time after the image information is received, wherein, if the electronic mail message transferring the received image information to the terminal at the mail address has not been sent within the predetermined period of time after the image information is received, the status report includes a message indicating that the received image information has not been transferred to the terminal at the mail address.

16. The network facsimile apparatus according to claim 13, wherein the sub-address and the password information are transmitted using a protocol signal defined according to a Group 3 facsimile transmission procedure.

17. The network facsimile apparatus according to claim 16, wherein the protocol signal includes a Transmitting Subscriber Identification signal.

18. The network facsimile apparatus according to claim 16, wherein the protocol signal includes a Sub-address signal and a Password signal.

19. A network facsimile apparatus, comprising:

a local area network connecting device for connecting the network facsimile apparatus to a local area network in order to exchange data over the local area network;

a publicly switched network connecting device for connecting the network facsimile apparatus to a publicly switched network in order to exchange facsimile data over the publicly switched network in accordance with a facsimile transmission procedure;

an address conversion table device for storing sub-address information including a plurality of sub-addresses according to the facsimile transmission procedure and a plurality of mail addresses respectively corresponding to the plurality of sub-addresses in a way that relates each of the plurality of sub-addresses to a corresponding mail address in order to transmit image information received over the publicly switched network via the local area network to a terminal at a mail address corresponding to a sub-address received when the image information is received from a transmitting terminal, and for storing password information corresponding to each of the plurality of the sub-addresses;

a comparator for comparing password information received with and corresponding to the received sub-address, to stored password information corresponding to the sub-address information stored in the address conversion table;

a password request device for sending an electronic mail message notifying of receipt of the image information and requesting password information from the terminal at the mail address corresponding to the received sub-address when the password information corresponding to the received sub-address received from a transmitting terminal corresponds to the stored password information; and a password check device for checking if password information in a received response mail message from the terminal at the mail address accords with the password information stored in the address conversion table device corresponding to the received sub-address and, if the password information in the received response mail message accords with the password information stored in the address conversion table device corresponding to the mail address, for transferring the received image information to the terminal at the mail address by way of an electronic mail message.

20. The network facsimile apparatus according to claim 19, further comprising a report generating device for generating a status report on a transfer status of the received image information to the terminal at the mail address and for originating a call to a destination included in a Transmission Subscriber Identification signal received when the image information is received to transmit image information of the status report to the destination.

21. The network facsimile apparatus according to claim 20, further comprising an image information transfer completion determining device for determining if the electronic mail message transferring the received image information to the terminal at the mail address has been sent within a predetermined period of time after the image information is received, wherein if then electronic mail message transferring the received image information to the terminal at the mail address has not been sent within the predetermined period of time after the image information is received, the status report includes a message indicating that the received image information has not been transferred to the terminal at the mail address.

22. The network facsimile apparatus according to claim 19, wherein the sub-address and the password information are transmitted using a protocol signal defined according to a Group 3 facsimile transmission procedure.

23. The network facsimile apparatus according to claim 22, wherein the protocol signal includes a Transmitting Subscriber Identification signal.

24. The network facsimile apparatus according to claim 22, wherein the protocol signal includes a Sub-address signal and a Password signal.

* * * * *